US012541140B2

(12) United States Patent
Jung et al.

(10) Patent No.: US 12,541,140 B2
(45) Date of Patent: *Feb. 3, 2026

(54) CAMERA MODULE

(71) Applicant: SAMSUNG ELECTRO-MECHANICS CO., LTD., Suwon-si (KR)

(72) Inventors: Jaewon Jung, Suwon-si (KR); Jaekyung Kim, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 195 days.

This patent is subject to a terminal disclaimer.

(21) Appl. No.: 18/297,073

(22) Filed: Apr. 7, 2023

(65) Prior Publication Data
US 2023/0350274 A1 Nov. 2, 2023

(30) Foreign Application Priority Data

Apr. 27, 2022 (KR) .................. 10-2022-0052113
Feb. 15, 2023 (KR) .................. 10-2023-0019807

(51) Int. Cl.
G03B 17/12 (2021.01)
G03B 3/10 (2021.01)

(52) U.S. Cl.
CPC .............. *G03B 17/12* (2013.01); *G03B 3/10* (2013.01); *G03B 2217/002* (2013.01)

(58) Field of Classification Search
CPC ..... G03B 17/12; G03B 3/10; G03B 2217/002
See application file for complete search history.

(56) References Cited

U.S. PATENT DOCUMENTS

2023/0236385 A1* 7/2023 Park .................. G02B 7/08
359/823

FOREIGN PATENT DOCUMENTS

| CN | 201740956 U | 2/2011 | |
| CN | 117836688 A | * 4/2024 | .............. G03B 5/00 |
| KR | 10-0847430 B1 | 7/2008 | |

(Continued)

OTHER PUBLICATIONS

Korean Office Action Issued on Apr. 3, 2025, in Counterpart Korean Patent Application No. 10-2023-0019807 (4 Pages in English, 4 Pages in Korean).

(Continued)

*Primary Examiner* — Christopher E Mahoney
(74) *Attorney, Agent, or Firm* — NSIP Law

(57) ABSTRACT

A camera module is provided. The camera module includes a housing having an internal space and an inner surface rolling part provided on an inner surface thereof; a carrier accommodating a lens barrel, and having an outer surface rolling part provided on an outer surface thereof; an autofocus driving part that generates driving power to move the carrier in an optical axis direction; and a rolling member interposed between the inner surface rolling part and the outer surface rolling part. At least one of the inner surface rolling part and the outer surface rolling part includes a guide surface provided on an outer surface of bodies of the housing or the carrier, and a reinforcement insertion body composed of a material higher in strength than a material of the bodies of the housing or the carrier. A plurality of rails are disposed on the guide surface.

16 Claims, 9 Drawing Sheets

(56) References Cited

FOREIGN PATENT DOCUMENTS

| KR | 20200073096 A | * | 6/2020 | ............. G03B 17/12 |
| KR | 10-2297014 B1 | | 9/2021 | |

OTHER PUBLICATIONS

Korean Office Action issued on Nov. 24, 2025, in counterpart Korean Patent Application No. 10-2023-0019807 (4 pages in English, 4 pages in Korean).

* cited by examiner

CAMERA MODULE

CROSS-REFERENCE TO RELATED APPLICATIONS

This application claims the benefit under 35 USC § 119(a) of Korean Patent Application No. 10-2022-0052113 filed on Apr. 27, 2022 in the Korean Intellectual Property Office, and Korean Patent Application No. 10-2023-0019807 filed on Feb. 15, 2023 in the Korean Intellectual Property Office, the entire disclosures of which are incorporated herein by reference for all purposes.

BACKGROUND

1. Field

The following description relates to a camera module.

2. Description of Related Art

With the development of information communication and semiconductor technologies, electronic devices have rapidly spread. These electronic devices may converge various operations, and provide the converged operations without remaining in a typical region.

Recently, cameras have been applied to portable electronic devices such as, but not limited to, tablet personal computers (PCs) and laptop computers as well as smartphones. The camera of the portable electronic device implements an autofocus (AF) operation, an optical image stabilizer (OIS) operation, and a zoom operation.

The optical image stabilizer operation may include both camera-swaying correction or hand-shaking correction, and may prevent an image of a subject to be captured from being subjected to blurring because of a photographer's inadvertent hand-shaking or camera-swaying in a state in which the camera is being moved or fixed.

The autofocus operation refers to an operation that acquires a clear image on an image formation plane of an image sensor by moving a lens, which is positioned forward of the image sensor, in an optical axis direction in accordance with a distance from the subject.

High-magnification lenses and high-capacity actuators have been introduced as cameras for portable electronic devices and are gradually improved in performance. Therefore, the weights of the constituent components has increased, and the constituent components are exposed to situations such as vibration in an actual life condition, such that deformation may often occur based on the impact between the constituent components. Accordingly, it may be beneficial to ensure the rigidity of the constituent component in order to prepare for the implementation of high-magnification and high-capacity performance.

The above information disclosed in this Background section is only for enhancement of understanding of the background of the described technology, and therefore it may contain information that does not constitute prior art that is already known to a person of ordinary skill in the art.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a housing having an internal space, and having an inner surface rolling part provided on an inner surface of the housing; a carrier, disposed in the internal space of the housing, and configured to accommodate a lens barrel, the carrier having an outer surface rolling part provided on an outer surface of the carrier and spatially corresponding to the inner surface rolling part; an autofocus (AF) driving part configured to generate driving power to move the carrier in an optical axis direction in the housing; and a rolling member interposed between the inner surface rolling part and the outer surface rolling part, wherein at least one of the inner surface rolling part and the outer surface rolling part comprises: a guide surface that is provided on an outer surface of a body of the housing or an outer surface of a body of the carrier, and a reinforcement insertion body composed of a material that is higher in strength than a material of the body of the carrier and the body of the housing and wherein the reinforcement insertion body has a plurality of rails disposed on the guide surface, and the plurality of rails are spaced apart from one another.

The rolling member may be positioned to be in contact with the reinforcement insertion body.

The plurality of rails may have a shaft shape having a circular transverse section.

A diameter of a transverse section of each of the plurality of rails may be within a range of 0.3 mm to 1.5 mm.

The plurality of rails may extend in parallel in the optical axis direction.

The body of the carrier or the body of the housing may be made of a polymer material, and the reinforcement insertion body is made of a metallic material.

Low-friction coating may be applied to a surface of the reinforcement insertion body.

The plurality of rails may be disposed to be at least partially exposed from the guide surface.

The guide surface of the body of the carrier or the body of the housing may include a pair of rolling surfaces facing each other at a preset angle.

The reinforcement insertion body may include a pair of rails, and the pair of rails may be respectively distributed and disposed on the pair of rolling surfaces.

The reinforcement insertion body may be disposed in each of the inner surface rolling part and the outer surface rolling part.

The reinforcement insertion body disposed in the inner surface rolling part and the reinforcement insertion body disposed in the outer surface rolling part may each include a pair of rails.

The reinforcement insertion body disposed in the inner surface rolling part may include a pair of rails, and the reinforcement insertion body disposed in the outer surface rolling part comprises a single flat plate member.

In a general aspect, a camera module includes an outer frame having an internal space, and having an inner surface rolling part provided on an inner surface of the outer frame; an inner frame, disposed in the internal space of the outer frame, and configured to accommodate a lens barrel, the inner frame configured to have an outer surface rolling part provided on an outer surface of the inner frame, and spatially corresponding to the inner surface rolling part; and a rolling member interposed between the inner surface rolling part and the outer surface rolling part, wherein at least one of the inner surface rolling part and the outer surface rolling part comprises: a reinforcement insertion body at least partially exposed from an outer surface of a body of the outer frame or a body of the inner frame, and the reinforcement insertion body is made of a material that is higher in strength than a material of the body of the carrier and the body of the housing and the reinforcement insertion body is configured to have a plurality of rails spaced apart from one another and disposed to be in contact with the rolling member.

Each of the plurality of rails may be configured to have a shaft shape having a circular transverse section.

The body of the carrier or the body of the housing may be made of a polymer material, and the reinforcement insertion body is made of a metallic material.

In a general aspect, a camera module includes a housing comprising inner surface rolling parts disposed on an inner surface of the housing; a carrier comprising outer surface rolling parts disposed on an outer surface of the carrier; wherein the outer surface rolling parts comprise: a first outer surface rolling part comprising a first reinforcement insertion body including a plurality of rails disposed on a guide surface of the first outer surface rolling part of the carrier; and a second outer surface rolling part comprising a second reinforcement insertion body, including a flat plate member disposed on a guide surface of the second outer surface rolling part of the carrier, wherein surfaces of the first reinforcement insertion body and the second reinforcement insertion body include a low-friction coating.

The flat plate member comprises a first portion that extends in an optical axis direction, and a second portion that extends in a direction perpendicular to the optical axis direction.

A strength of a material of the first reinforcement insertion body and the second reinforcement insertion body may be greater than a strength of a material of the housing and a material of the carrier.

Other features and aspects will be apparent from the following detailed description, the drawings, and the claims.

Figure 1:
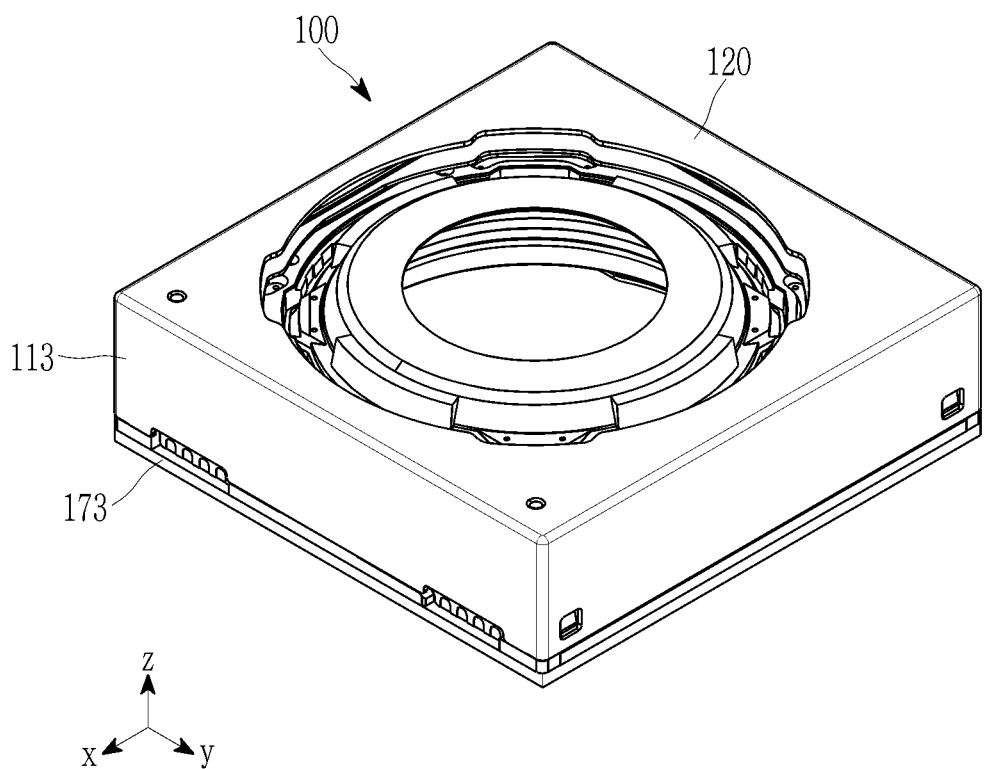
FIG. 1 is a perspective view illustrating an external appearance of an example camera module, in accordance with one or more embodiments.

Throughout the drawings and the detailed description, unless otherwise described or provided, the same drawing reference numerals may understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

In addition, when one component such as a layer, a film, a region, or a plate is described as being positioned "above" or "on" another component, one component can be positioned "directly on" another component, and one component can also be positioned on another component with other components interposed therebetween. On the contrary, when one component is described as being positioned "directly above" another component, there is no component therebetween. In addition, when a component is described as being positioned "above" or "on" a reference part, the component may be positioned "above" or "below" the reference part, and this configuration does not necessarily mean that the component is positioned "above" or "on" the reference part in a direction opposite to gravity.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, the word "in a plan view" means when an object is viewed from above, and the word "in a cross-sectional view" means when a cross section made by vertically cutting an object is viewed from a lateral side.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

The one or more examples provide a camera module that maintains driving performance by having high impact resistance while smoothly implementing an autofocusing operation and a swaying correction operation.

In an example, it is possible to ensure driving power to move the lens, and ensure impact resistance of the constituent components while implementing the autofocusing operation and the image stabilization operation.

Figure 2:
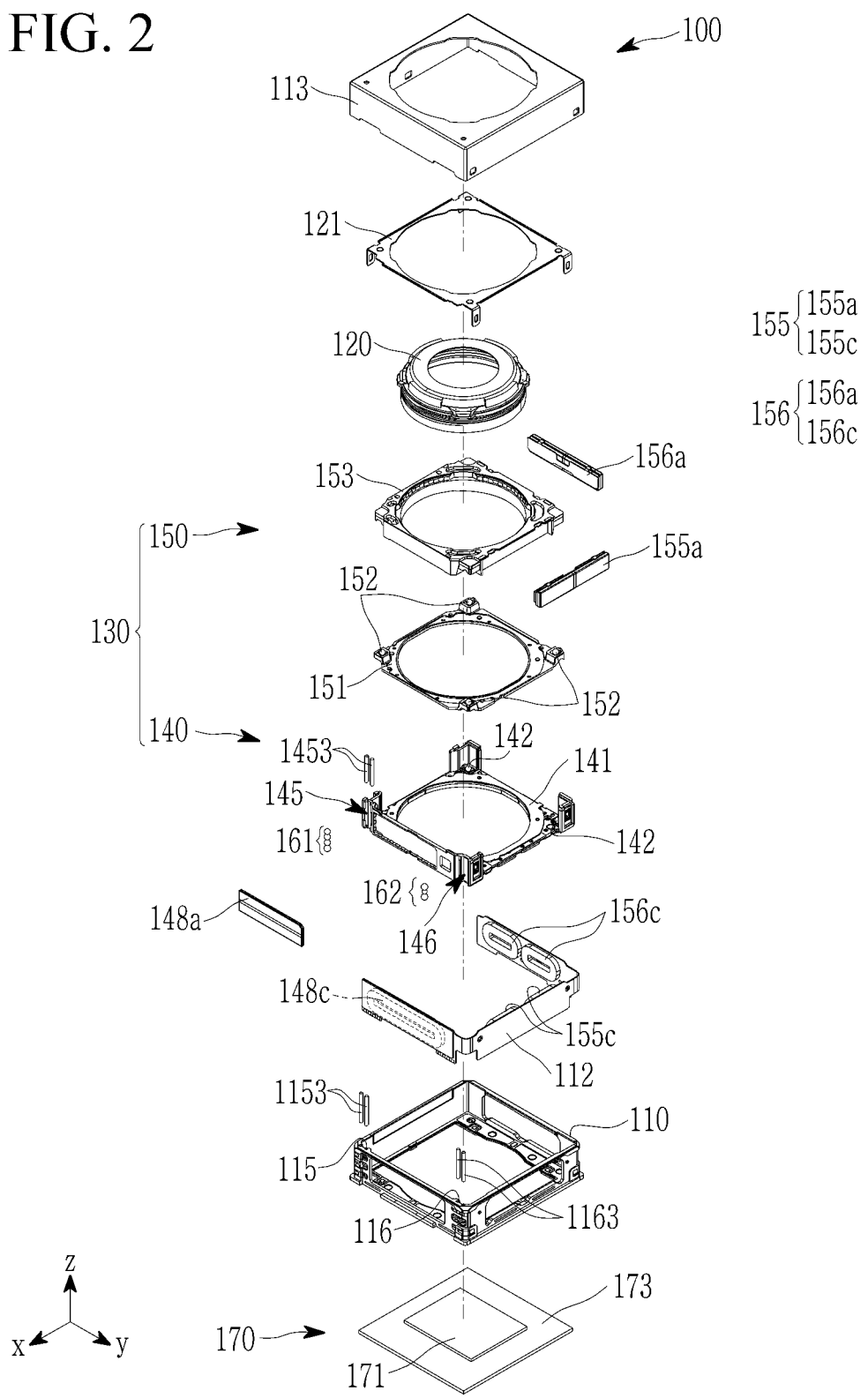
FIG. 2 is an exploded perspective view schematically illustrating the example camera module illustrated in FIG. 1.

FIG. 1 is a perspective view illustrating an external appearance of an example camera module according, in accordance with one or more embodiments, and FIG. 2 is an exploded perspective view schematically illustrating the example camera module illustrated in FIG. 1.

Referring to FIGS. 1 and 2, an example camera module 100, in accordance with one or more embodiments, includes a lens barrel 120, a lens driving device 130 configured to move the lens barrel 120, an image sensor unit 170 configured to convert light, which enters through the lens barrel 120, into an electrical signal, a housing 110 configured to accommodate the lens barrel 120 and the lens driving device 130 in an internal space thereof, and a cover 113 configured to cover the housing 110.

The lens barrel 120 may have a hollow cylindrical shape so as to accommodate therein a plurality of lenses used to capture an image of a subject, and the plurality of lenses may be mounted along an optical axis in the lens barrel 120. A desired number of lenses may be disposed in the lens barrel 120 in accordance with the desired implementation of the lens barrel 120. The respective lenses may have the same or different optical characteristics such as refractive indexes.

The optical axis may be set as a central axis of the lens accommodated in the lens barrel 120. An optical axis direction is a direction parallel to the central axis. In the drawings, the optical axis is set as a z-axis, and an x-axis and a y-axis are preset as directions perpendicular to the optical axis. In this example, the x-axis and the y-axis are perpendicular to each other, and an x-y plane defined by the x-axis and the y-axis is a plane perpendicular to the optical axis.

The lens driving device 130 refers to a device configured to move the lens barrel 120, and includes an auto focus (AF) unit 140 configured to adjust a focal point, and an optical image stabilizer (OIS) unit 150 configured to correct handshaking or swaying.

For example, the lens driving device 130 may adjust the focal point by moving the lens barrel 120 in an optical axis direction (the z-axis direction in the drawings) by implementing the AF unit 140. The lens driving device 130 may correct swaying at the time of capturing an image by moving the lens barrel 120 in a direction (the x-axis or y-axis direction in the drawings) perpendicular to the optical axis by using the OIS unit 150.

The AF unit 140 includes a carrier 141 configured to accommodate the lens barrel 120, and an AF driving part configured to generate driving power to move the lens barrel 120 and the carrier 141 in the optical axis direction. The AF driving part includes an AF driving magnet 148a and an AF driving coil 148c.

When power is applied to the AF driving coil 148c, the carrier 141 may be moved in the optical axis direction by an electromagnetic force between the AF driving magnet 148a and the AF driving coil 148c. Since the carrier 141 accommodates the lens barrel 120, the focal point may be adjusted as the lens barrel 120 is also moved in the optical axis direction by the movement of the carrier 141.

In an example, the AF driving magnet 148a may be mounted on one surface of the carrier 141, and the AF driving coil 148c may be mounted on the housing 110 based on a substrate 112. In this example, the AF driving magnet 148a is a movable member mounted on the carrier 141 and configured to move in the optical axis direction with the carrier 141. The AF driving coil 148c is a stationary member fixed to the housing 110. However, the one or more examples are not limited thereto. The positions of the AF driving magnet 148a and the AF driving coil 148c may be changed.

Inner surface rolling parts 115 and 116 and outer surface rolling parts 145 and 146 may be respectively formed on the housing 110 and the carrier 141 to guide the movement of the carrier 141 in the optical axis direction while reducing friction between the carrier 141 and the housing 110 when the carrier 141 moves. The inner surface rolling parts 115 and 116 may be formed on an inner surface of the housing 110, the outer surface rolling parts 145 and 146 may be formed on an outer surface of the carrier 141, and the inner surface rolling parts 115 and 116 and the outer surface rolling parts 145 and 146 may be disposed to correspond to one another.

Rolling members 161 and 162 may be respectively disposed between the inner surface rolling parts 115 and 116 and the outer surface rolling parts 145 and 146, and may reduce friction when the carrier 141 moves in the optical axis direction. In an example, the rolling members 161 and 162 may each be provided in the form of a ball, and may be composed of ceramic oxide, as an example. The rolling members 161 and 162 may be configured as a plurality of ball units disposed, and may be aligned in the optical axis direction between the inner surface rolling parts 115 and 116 and the outer surface rolling parts 145 and 146.

The OIS unit 150 may prevent an image from being blurred or may prevent a video from swaying because of factors such as user's hand shaking during a process of capturing an image or shooting a video. When swaying occurs because of the user's hand shaking or the like at the time of the capturing of an image, the OIS unit 150 compensates for swaying by applying a relative displacement, which corresponds to the swaying, to the lens barrel 120. In an example, the OIS unit 150 may correct the swaying by moving the lens barrel 120 in the first and second directions (x-axis and y-axis) perpendicular to the optical axis direction.

The OIS unit 150 may include a guide member configured to guide the movement of the lens barrel 120, and an OIS driving part configured to generate driving power to move the guide member in the direction perpendicular to the optical axis.

The guide member includes a support frame 151 and a lens holder 153. The support frame 151 and the lens holder 153 are accommodated in the carrier 141, and are aligned in the optical axis direction, and the support frame 151 and the lens holder 153 may guide the movement of the lens barrel 120.

The OIS driving part includes a first OIS driving part 155 and a second OIS driving part 156. The first OIS driving part 155 generates driving power in a first direction (the x-axis direction in the drawings) perpendicular to the optical axis. The second OIS driving part 156 generates driving power in a second direction (the y-axis direction in the drawings) perpendicular to the first direction. The first and second OIS driving parts 155 and 156 respectively include OIS driving magnets 155a and 156a and OIS driving coils 155c and 156c.

In an example, a plurality of rolling members 142 and 152 are provided to support the OIS unit 150. The plurality of rolling members 142 and 152 may allow the lens holder 153 and the support frame 151 to smoothly move during an OIS operating process. Additionally, the plurality of rolling members 142 and 152 may also maintain intervals between the carrier 141, the support frame 151, and the lens holder 153.

The plurality of rolling members 142 and 152 include first rolling members 152 and second rolling members 142. The first rolling members 152 are related to the movement of the OIS unit 150 in the first direction (x-axis direction), and the second rolling members 142 are related to the movement of the OIS unit 150 in the second direction (y-axis direction). The first rolling members 152 include a plurality of ball members disposed between the lens holder 153 and the support frame 151, and the second rolling members 142 include a plurality of ball members disposed between the support frame 151 and the carrier 141.

The image sensor unit 170 is a device configured to convert light, which enters through the lens barrel 120, into an electrical signal. For example, the image sensor unit 170 may include an image sensor 171 and a circuit board 173 connected to the image sensor 171, and may further include an infrared ray filter. The infrared ray filter may block beams in an infrared region among the beams entering through the lens barrel 120.

The lens barrel 120 and the lens driving device 130 may be accommodated in the internal space of the housing 110. In an example, the housing 110 may be provided in the form of a box opened at upper and lower sides thereof. The image sensor unit 170 may be disposed at the lower side of the housing 110. A stopper 121 may be further disposed at the upper side of the lens barrel 120 to prevent the support frame 151 and the lens holder 153 from being separated from the internal space of the carrier 141. The stopper 121 may be coupled to the carrier 141.

The cover 113 is coupled to the housing 110 so as to surround an outer surface of the housing 110, and may protect configuration components in the camera module. Additionally, the cover 113 may block electromagnetic waves. In an example, the cover 113 may be configured as a metal shield can, and may block electromagnetic waves so that the electromagnetic waves generated in the camera module 100 do not affect the other electronic components in a portable electronic device.

Figure 3:
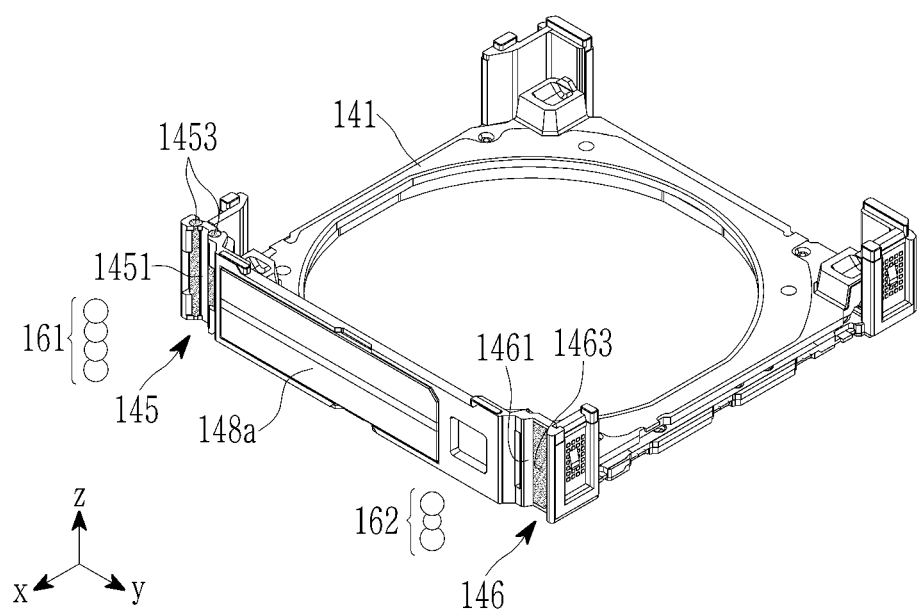
FIG. 3 is a perspective view illustrating a carrier and a rolling member of the example camera module illustrated in FIG. 2.

FIG. 3 is a perspective view illustrating the carrier 141 and the rolling member 142 of the camera module illustrated in FIG. 2.

Referring to FIG. 3, the carrier 141 of the camera module 100, in accordance with one or more embodiments, may include the outer surface rolling parts 145 and 146 formed on an outer surface of one sidewall of the carrier 141. The pair of outer surface rolling parts 145 and 146 may be disposed at two opposite sides of the one sidewall of the carrier 141 based on a center in a width direction (y-axis direction) of one sidewall. One sidewall may be a sidewall of the carrier 141 on which the AF driving magnet 148a is disposed.

The outer surface rolling parts 145 and 146 may include guide surfaces 1451 and 1461 formed on an outer surface of a mold (or a body) that forms an external appearance of the carrier 141. The guide surfaces 1451 and 1461 may be elongated in the optical axis direction (z-axis direction), and may guide the motions of the rolling members 161 and 162 in the optical axis direction. In a non-limiting example, the guide surfaces 1451 and 1461 may each be formed as a concave groove recessed in the direction perpendicular to the optical axis.

In an example, the outer surface rolling parts 145 and 146 disposed on the carrier 141 may include: the first outer surface rolling part 145 having a guide surface 1451 with which the rolling member 161 having a ball shape is in contact at two points; and the second outer surface rolling part 146 having a guide surface 1461 with which the rolling member 162 is in contact at one point. The guide surface 1451 of the first outer surface rolling part 145 may include a pair of V-shaped rolling surfaces being respectively in contact with the rolling members 161 while facing one another at a preset angle. The guide surface 1461 of the second outer surface rolling part 146 may include a flat rolling surface being in contact with the rolling member 162. However, this is only an example, and the shapes of the first and second outer surface rolling parts 145 and 146 may be changed with respect to each other, and the V-shaped rolling surfaces may be formed on both the first and second outer surface rolling parts 145 and 146. This configuration is only an example, and other configurations may be implemented.

In the present embodiment, the first outer surface rolling part 145 may include a reinforcement insertion body having a plurality of rails 1453 disposed on the guide surface 1451 and spaced apart from one another. The second outer surface rolling part 146 may include a reinforcement insertion body having a single flat plate member 1463 disposed on the guide surface 1461. In an example, the reinforcement insertion body may be made of a material higher in strength than a material of the mold, or the body of the carrier 141. The reinforcement insertion body may be integrally fixed in the mold or the carrier by insert injection molding. In a non-limited example, the mold, or the body of the carrier 141, may be made of a polymer material, and the reinforcement insertion body may be metallic.

Specifically, the reinforcement insertion body may be made of a metallic material selected from a group consisting of SUS, Ti, and Al, as only examples, and mechanical properties of the reinforcement insertion body may be selectively improved by heat treatment. Additionally, low-friction coating may be applied to the surface of the reinforcement insertion body to optimize driving power for driving the lens. In an example, polytetrafluoroethylene (PTFE) coating may be applied, or electroless nickel coating including sub-micron PTFE particles may be applied.

Referring to FIG. 3, the pair of rails 1453 of the reinforcement insertion body disposed on the first outer surface rolling part 145 may extend in a direction parallel with the optical axis direction from the guide surface 1451, and may be at least partially exposed from the guide surface 1451. Additionally, the pair of rails 1453 may be respectively distributed and disposed on a pair of rolling surfaces facing each other.

Therefore, the rolling members 161 and 162, which are each provided in the form of a ball, roll along the pair of rails 1453 and the flat plate member 1463 on the respective guide surfaces 1451 and 1461 of the first and second outer surface rolling parts 145 and 146 while being in contact with the pair of rails 1453 and the flat plate member 1463. The rolling members 161 and 162 may each be provided in the form of a metal ball, and may be in contact with the reinforcement insertion body made of a metallic material on the guide surfaces 1451 and 1461, such that it is possible to prevent damage to the guide surfaces 1451 and 1461 caused by the rolling members 161 and 162, and thus prevent deformation (denting) of the ball guide. In an example, the rolling members 161 corresponding to the first outer surface rolling part 145 may include four ball members, and the rolling members 162 corresponding to the second outer surface rolling part 146 may include three ball members. However, this is only an example, and ball members may be implemented in various numbers.

Figure 4:
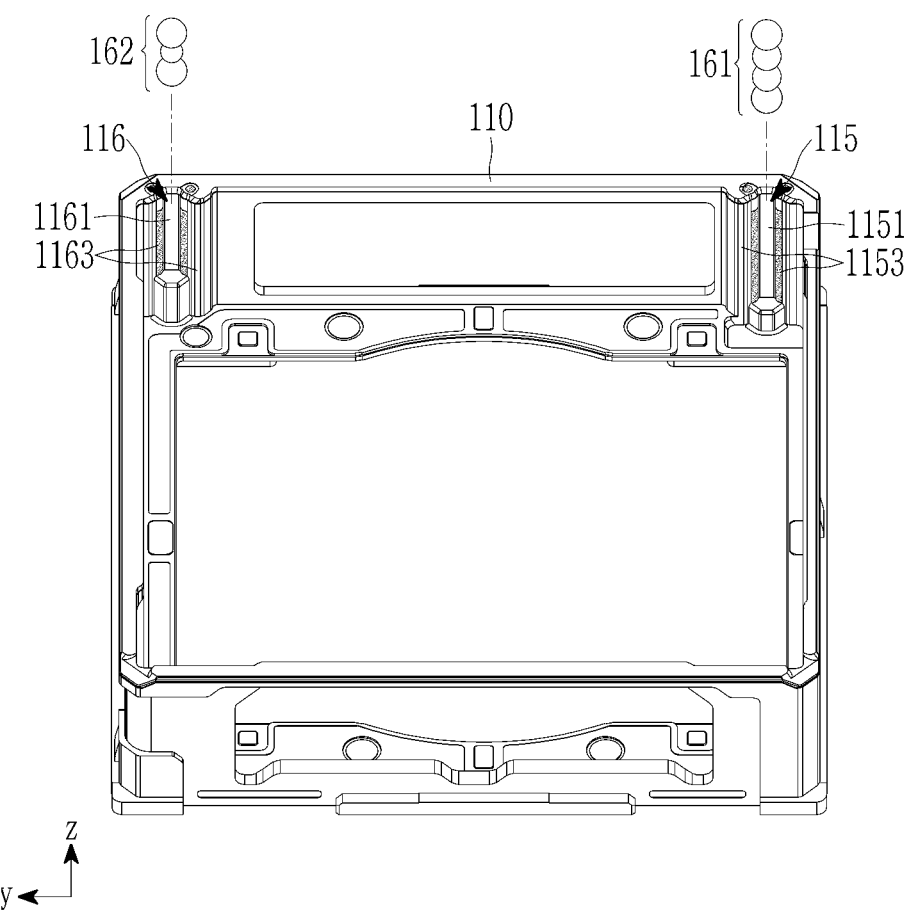
FIG. 4 is a perspective view illustrating a housing and the rolling member of the example camera module illustrated in FIG. 2.

FIG. 4 is a perspective view illustrating the housing 110 and the rolling members 161 and 162 of the example camera module illustrated in FIG. 2.

Referring to FIG. 4, the housing 110 of the example camera module 100, in accordance with one or more embodiments, may include the inner surface rolling parts 115 and 116 formed on the inner surface of one sidewall. The pair of inner surface rolling parts 115 and 116 may be disposed at two opposite sides of the inner surface of one sidewall based on a center in a width direction (y-axis direction) of one sidewall. One sidewall may be a sidewall of the housing 110 on which the AF driving coil 148c or the AF driving magnet 148c is disposed (see FIG. 2).

The inner surface rolling parts 115 and 116 may include guide surfaces 1151 and 1161 formed on an outer surface of a mold that forms an external appearance, or the body, of the housing 110. The guide surfaces 1151 and 1161 may be elongated in the optical axis direction (z-axis direction) and may guide the motions of the rolling members 161 and 162 in the optical axis direction.

Additionally, the inner surface rolling parts 115 and 116 may include a reinforcement insertion body having a plurality of rails 1153 and 1163 spaced apart from one another on the guide surfaces 1151 and 1161. In an example, the reinforcement insertion body may be made of a material that is higher in strength than a material of the mold, or the body of the housing 110. The reinforcement insertion body may be integrally fixed in the mold (or body of the housing 110) by insert injection molding, as an example. In an example, the mold (or body of the housing 110) may be made of a polymer material, and the reinforcement insertion body may be metallic.

Specifically, the reinforcement insertion body may be made of a metallic material selected from a group consisting of SUS, Ti, and Al, and only examples, and mechanical properties of the reinforcement insertion body may be selectively improved by heat treatment. Additionally, low-friction coating may be applied to the surface of the reinforcement insertion body to optimize driving power for driving the lens. In an example, polytetrafluoroethylene (PTFE) coating may be applied, or electroless nickel coating including sub-micron PTFE particles may be applied.

In one or more examples, a metal insert may be provided in a rolling surface in the ball guide groove in an example where the ball unit is applied to implement the autofocusing operation. Accordingly, it is possible to prevent damage to the mold caused by the ball unit and prevent deformation (for example, denting) of the ball guide.

Referring to FIG. 4, the pair of rails 1153 and 1163 of the reinforcement insertion body may extend in a direction that is parallel to the optical axis direction from the guide surfaces 1151 and 1161, and may be exposed from the guide surfaces 1151 and 1161. Additionally, the guide surfaces 1151 and 1161 may include a pair of rolling surfaces facing each other at a preset angle. In this example, the pair of rails 1153 and 1163 may be respectively distributed and disposed on the pair of rolling surfaces.

Therefore, the rolling members 161 and 162, which are each provided in the form of a ball, roll along the pair of rails 1153 and 1163 of the reinforcement insertion body on the guide surfaces 1151 and 1161 of the inner surface rolling parts 115 and 116 while being in contact with the pair of rails 1153 and 1163. The rolling members 161 and 162 may each be provided in the form of a metal ball, and may be in contact with the reinforcement insertion body made of a metallic material on the guide surfaces 1151 and 1161 while facing the reinforcement insertion body, such that it is possible to prevent damage to the guide surfaces 1151 and 1161 caused by the rolling members 161 and 162, and thus prevent deformation (dent) of the ball guide.

Figure 5:
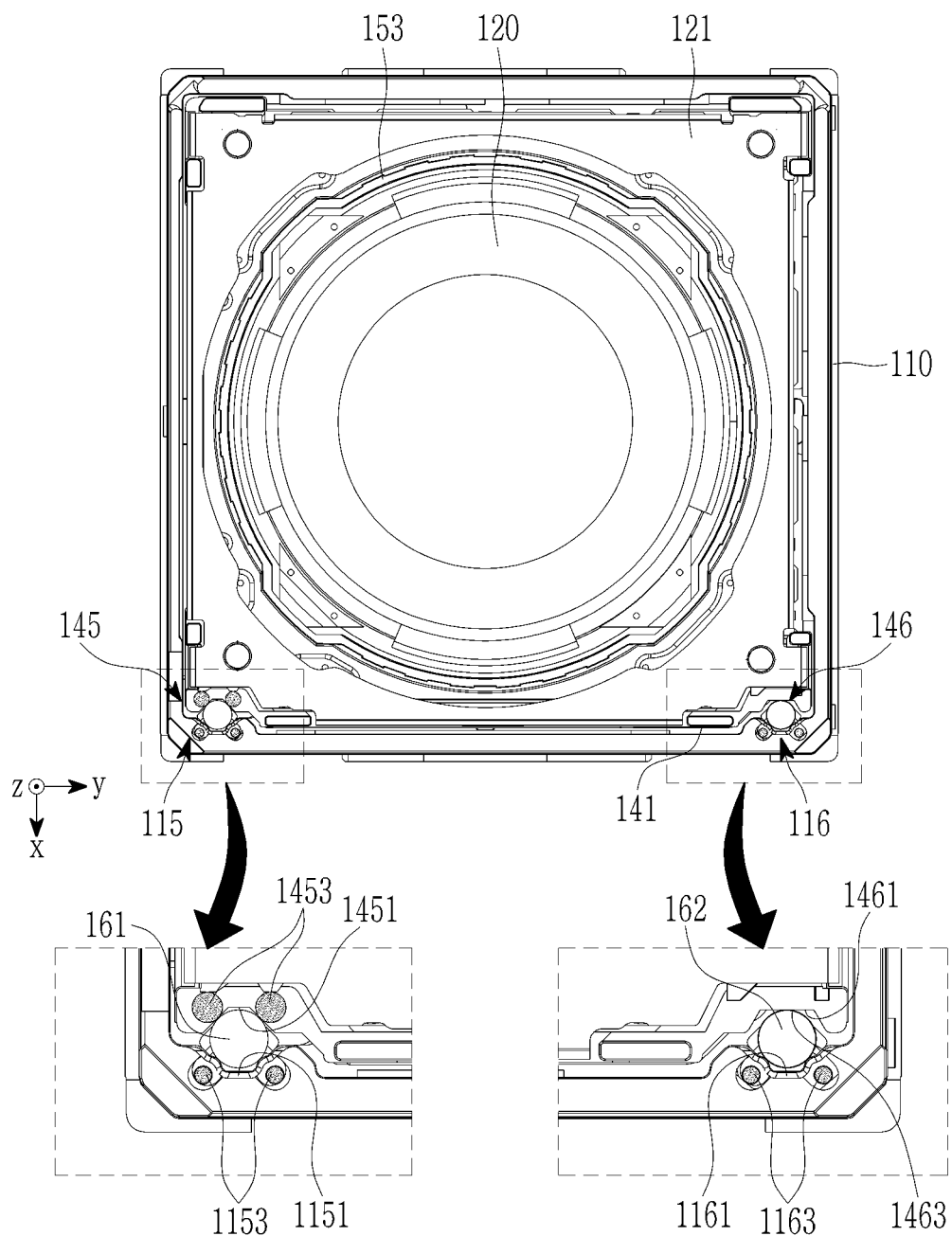
FIG. 5 is a top plan view illustrating an interior of the example camera module illustrated in FIG. 1 from which a cover is removed.

FIG. 5 is a top plan view illustrating an interior of the example camera module illustrated in FIG. 1 from which the cover is removed.

Referring to FIG. 5, the outer surface rolling parts 145 and 146 and the inner surface rolling parts 115 and 116 may be positioned to face one another as the carrier 141 and the housing 110 are coupled. The rolling members 161 and 162 may be disposed between the outer surface rolling parts 145 and 146 and the inner surface rolling parts 115 and 116. The outer surface rolling parts 145 and 146 and the inner surface rolling parts 115 and 116 may respectively have concave guide surfaces 1451, 1461, 1151, and 1161 recessed in opposite directions perpendicular to the optical axis. The rolling members 161 and 162 include a plurality of ball members. Among the ball members, at least one ball member may be simultaneously in contact with the reinforcement insertion bodies of the outer surface rolling parts 145 and 146 and the inner surface rolling parts 115 and 116.

At least one ball member, which constitutes the rolling member 161 interposed between the first outer surface rolling part 145 and the first inner surface rolling part 115, may be positioned to be in contact with the pair of rails 1453 of the first outer surface rolling part 145 and the pair of rails 1153 of the first inner surface rolling part 115. At least one ball member, which constitutes the rolling member 162 interposed between the second outer surface rolling part 146 and the second inner surface rolling part 116 may be positioned to be in contact with the flat plate member 1463 of the second outer surface rolling part 146 and the pair of rails 1163 of the second inner surface rolling part 116.

Figure 6:
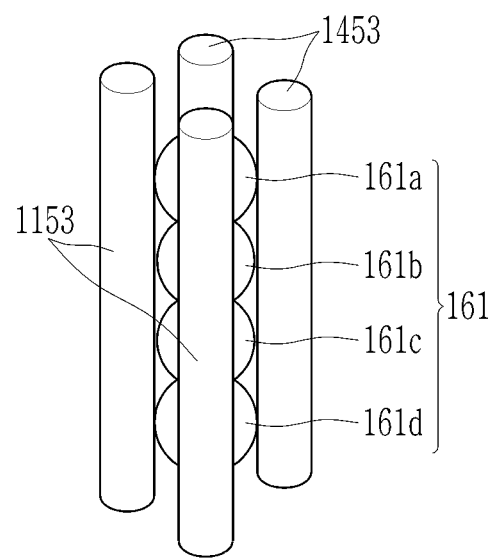
FIG. 6 is a perspective view illustrating the rolling member together with a plurality of rails extracted as reinforcement insertion bodies of the example camera module illustrated in FIG. 5.
Figure 7:
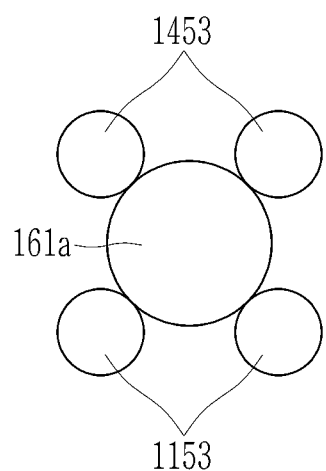
FIG. 7 is a top plan view illustrating the rolling member together with the plurality of rails illustrated in FIG. 6.

FIG. 6 is a perspective view illustrating the rolling member together with the plurality of rails extracted as the reinforcement insertion bodies of the example camera module illustrated in FIG. 5, and FIG. 7 is a top plan view illustrating the rolling member together with the plurality of rails illustrated in FIG. 6.

Referring to FIGS. 6 and 7, the plurality of rails 1453 and 1153 disposed in the first outer surface rolling part 145 and the first inner surface rolling part 115 may each have a shaft shape with a circular transverse section. Additionally, the plurality of rails 1453 and 1153 may extend in a direction that is parallel to the optical axis direction. In an example, a diameter of the transverse section of each of the rails 1453 and 1153 each having a shaft shape may be within a range of 0.3 mm to 1.5 mm. The insert injection molding may be hardly performed and carried out when the diameter of the transverse section of each of the rails 1453 and 1153 is less than 0.3 mm, and the size of the driving part may be unnecessarily increased when the diameter of the transverse section of each of the rails 1453 and 1153 is more than 1.5 mm.

The rolling members 161 interposed between the first outer surface rolling part 145 and the first inner surface rolling part 115 may include four ball members 161a, 161b, 161c, and 161d. A diameter of each of the ball members 161a and 161d, which are disposed at an outermost periphery (an uppermost end or a lowermost end) based on the optical axis direction among the four-ball members, may be larger than a diameter of each of the ball members 161b and 161c. Therefore, the two ball members 161a and 161d positioned at the outermost periphery may be in contact with the plurality of rails 1453 and 1153 of the first outer surface rolling part 145 and the first inner surface rolling part 115. However, the one or more examples are not limited thereto. A ball member, which is in contact with the rail with another combination, may be selected.

Figure 8:
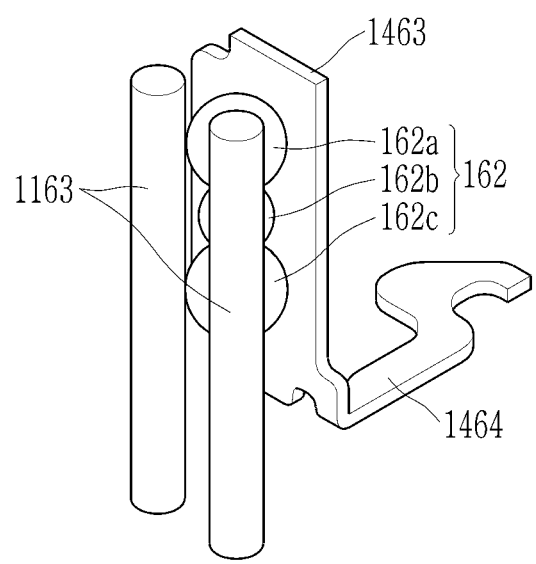
FIG. 8 is a perspective view illustrating the rolling member together with rails and a flat plate member extracted as reinforcement insertion bodies of the example camera module illustrated in FIG. 5.
Figure 9:
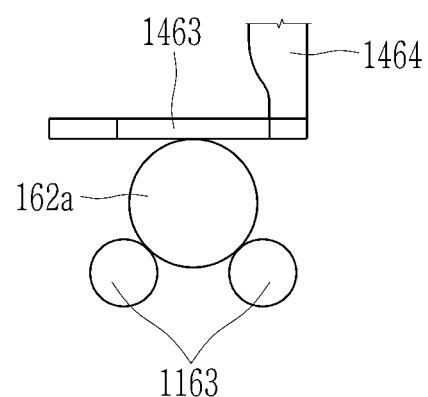
FIG. 9 is a top plan view illustrating the rolling member together with the rails and the flat plate member illustrated in FIG. 8.

FIG. 8 is a perspective view illustrating the rolling member, together with rails, and the flat plate member extracted as the reinforcement insertion bodies of the camera module illustrated in FIG. 5, and FIG. 9 is a top plan view illustrating the rolling member together with the rails and the flat plate member illustrated in FIG. 8.

Referring to FIGS. 8 and 9, the plurality of rails 1163 disposed in the second inner surface rolling part 116 may each have a shaft shape with a circular transverse section. Additionally, the plurality of rails 1163 may extend in parallel in the optical axis direction. In an example, a diameter of the transverse section of each of the rails 1163 each having a shaft shape may be within a range of 0.3 mm to 1.5 mm. The insert injection molding may be hardly performed and carried out when the diameter of the transverse section of the rail 1163 is less than 0.3 mm, and the size of the driving part may be unnecessarily increased when the diameter of the transverse section of the rail 1163 is more than 1.5 mm.

The flat plate member 1463 disposed on the second outer surface rolling part 146 may extend in the optical axis direction. A connection protrusion 1464, which is bent and extends in the direction perpendicular to the optical axis direction, may be integrally connected to one end of the flat plate member 1463 based on the longitudinal direction. The connection protrusion 1464 may be inserted into the mold for the carrier 141 to fix the flat plate member 1463.

The rolling members 162 interposed between the second outer surface rolling part 146 and the second inner surface rolling part 116 may include three ball members 162a, 162b, and 162c. However, this is only an example, and rolling members 162 may be implemented in various numbers of ball members.

In a non-limiting example, a diameter of each of the ball members 162a and 162c, which are disposed at the outermost periphery (the uppermost end or the lowermost end) based on the optical axis direction among the three ball members, may be larger than a diameter of the other ball member 162b. Therefore, the two ball members 162a and 162c positioned at the outermost periphery may be in contact with the flat plate member 1463 of the second outer surface rolling part 146 and the plurality of rails 1163 of the second inner surface rolling part 116. However, the one or more examples are not limited thereto. A ball member, which is in contact with the rail and the flat plate member with another combination, may be selected.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing having an internal space, and having an inner surface rolling part provided on an inner surface of the housing;
   a carrier, disposed in the internal space of the housing, and configured to accommodate a lens barrel, the carrier having an outer surface rolling part provided on an outer surface of the carrier and spatially corresponding to the inner surface rolling part;
   an autofocus (AF) driving part configured to generate driving power to move the carrier in an optical axis direction in the housing; and
   a rolling member interposed between the inner surface rolling part and the outer surface rolling part,
   wherein at least one of the inner surface rolling part and the outer surface rolling part comprises:
      a guide surface that is provided on an outer surface of a body of the housing or an outer surface of a body of the carrier, and a reinforcement insertion body composed of a material that is higher in strength than a material of the body of the carrier and a material of the body of the housing and wherein the reinforcement insertion body comprises a pair of rails disposed on the guide surface, and a rail in the pair is spaced apart from another rail in the pair.

2. The camera module of claim 1, wherein:
the rolling member is positioned to be in contact with the reinforcement insertion body.

3. The camera module of claim 1, wherein:
the plurality of rails comprise a shaft shape having a circular transverse section.

4. The camera module of claim 3, wherein:
a diameter of a transverse section of each of the pair of rails is within a range of 0.3 mm to 1.5 mm.

5. The camera module of claim 1, wherein:
the pair of rails extend in parallel in the optical axis direction.

6. The camera module of claim 1, wherein:
the body of the carrier or the body of the housing is made of a polymer material, and the reinforcement insertion body is made of a metallic material.

7. The camera module of claim 6, wherein:
low-friction coating is applied to a surface of the reinforcement insertion body.

8. The camera module of claim 1, wherein:
the pair of rails are disposed to be at least partially exposed from the guide surface.

9. The camera module of claim 1, wherein:
the guide surface of the body of the carrier or the body of the housing comprises a pair of rolling surfaces facing each other at a preset angle.

10. The camera module of claim 9, wherein:
the pair of rails are respectively distributed and disposed on the pair of rolling surfaces.

11. The camera module of claim 1, wherein:
the reinforcement insertion body is disposed in each of the inner surface rolling part and the outer surface rolling part.

12. The camera module of claim 11, wherein:
the reinforcement insertion body disposed in the inner surface rolling part and the reinforcement insertion body disposed in the outer surface rolling part each comprise a pair of rails.

13. The camera module of claim 11, wherein:
the reinforcement insertion body disposed in the inner surface rolling part comprises a pair of rails, and
the reinforcement insertion body disposed in the outer surface rolling part comprises a single flat plate member.

14. A camera module, comprising:
an outer frame having an internal space, and having an inner surface rolling part provided on an inner surface of the outer frame;
an inner frame, disposed in the internal space of the outer frame, and configured to accommodate a lens barrel, the inner frame configured to have an outer surface rolling part provided on an outer surface of the inner frame, and spatially corresponding to the inner surface rolling part; and
a rolling member interposed between the inner surface rolling part and the outer surface rolling part,
wherein at least one of the inner surface rolling part and the outer surface rolling part comprises:
a reinforcement insertion body at least partially exposed from an outer surface of a body of the outer frame or a body of the inner frame, and
the reinforcement insertion body is made of a material that is higher in strength than a material of the body of the carrier and the body of the housing and the reinforcement insertion body is configured to have a pair of rails disposed to be in contact with the rolling member,
wherein a rail in the pair is spaced apart from another rail in the pair.

15. The camera module of claim 14, wherein:
each of the pair of rails has a shaft shape having a circular transverse section.

16. The camera module of claim 14, wherein:
the body of the carrier or the body of the housing is made of a polymer material, and the reinforcement insertion body is made of a metallic material.

* * * * *